Dec. 15, 1936.  P. ELDER  2,064,199
ELECTRICAL CONDUIT
Filed May 21, 1932  3 Sheets-Sheet 1
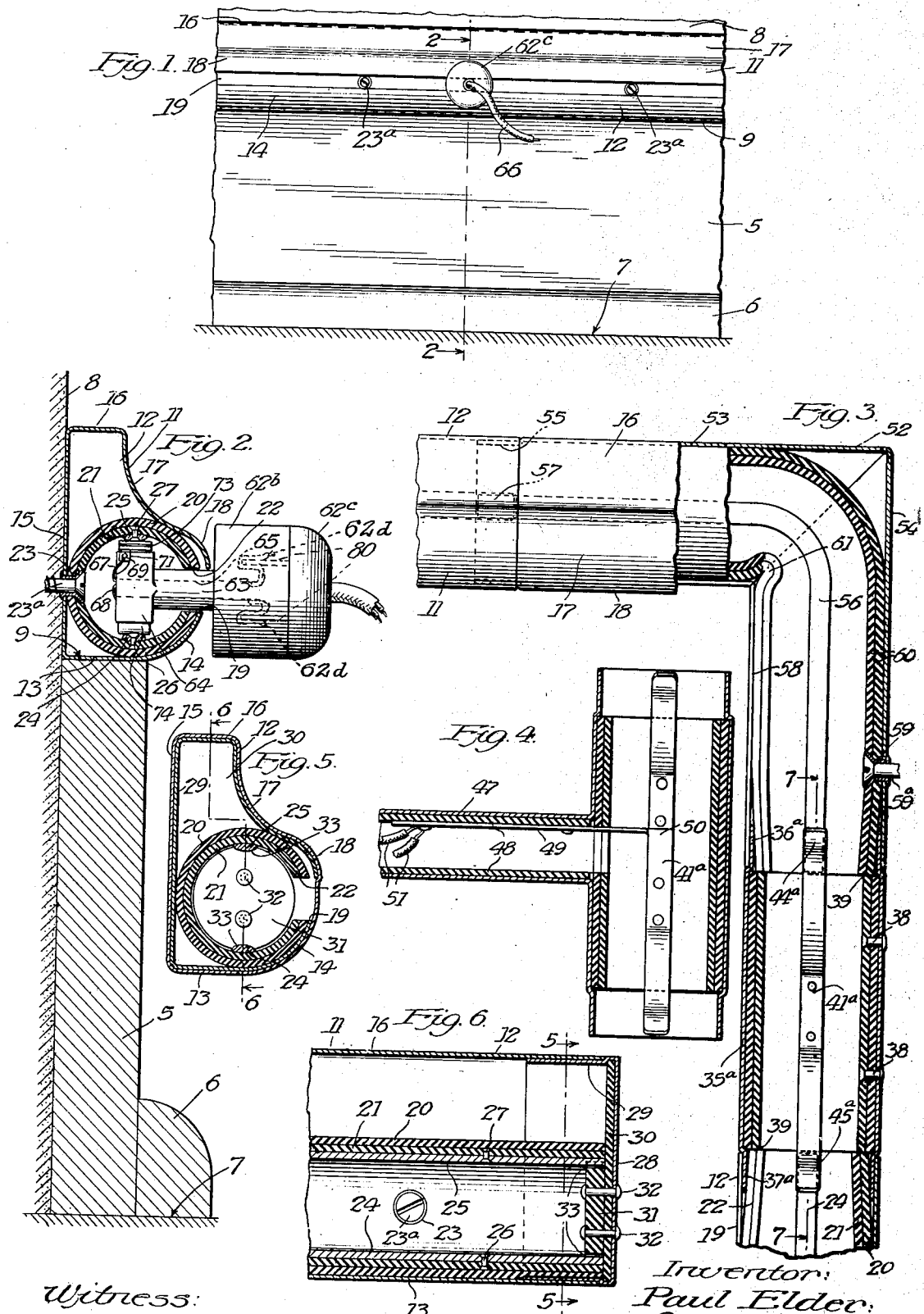
Inventor:
Paul Elder Dec. 15, 1936.    P. ELDER    2,064,199
ELECTRICAL CONDUIT
Filed May 21, 1932    3 Sheets-Sheet 2
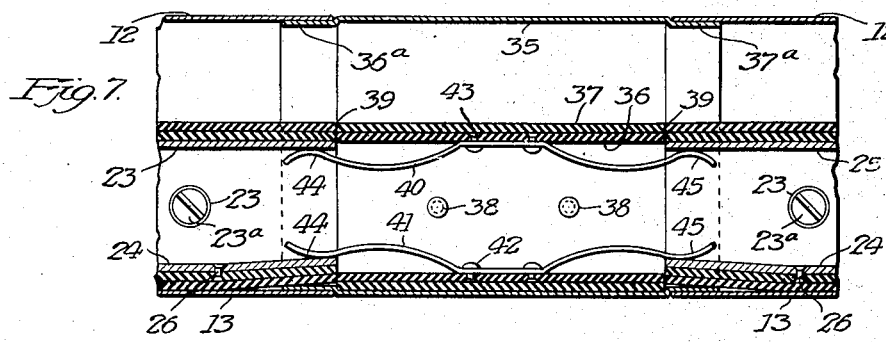
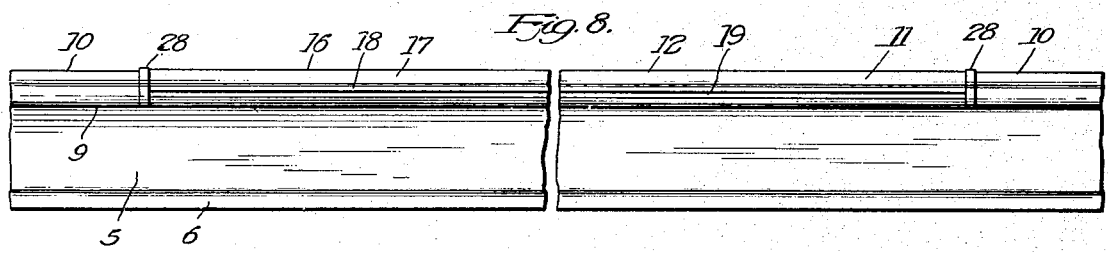
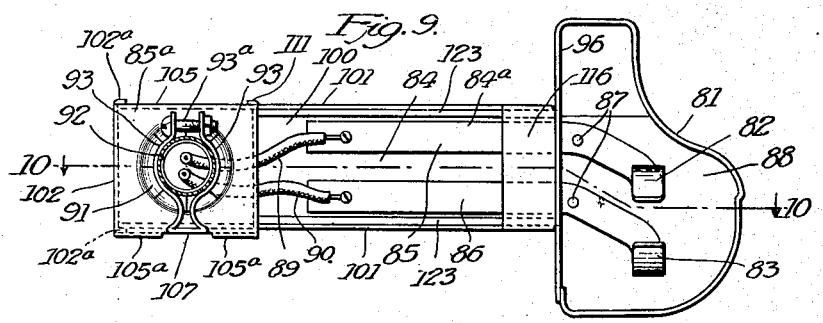
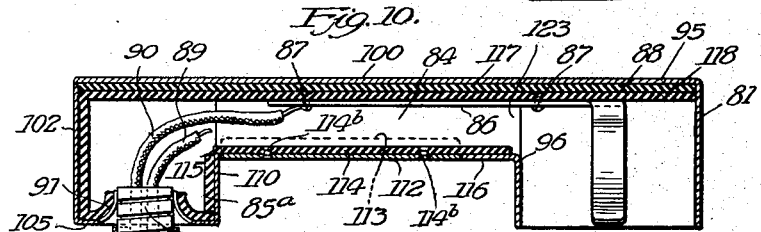
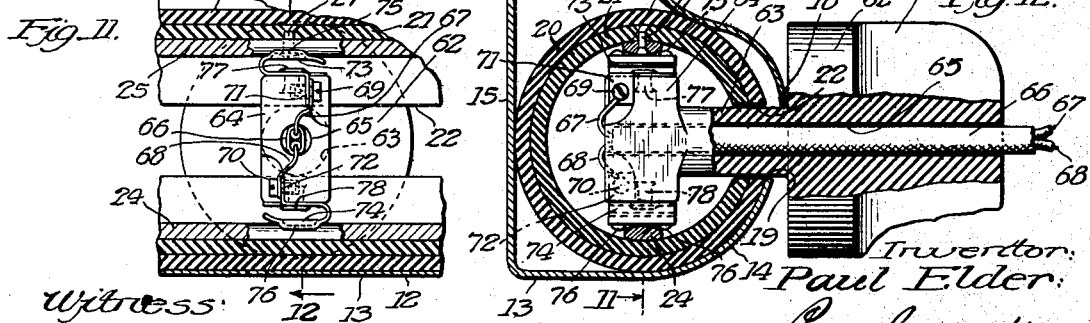

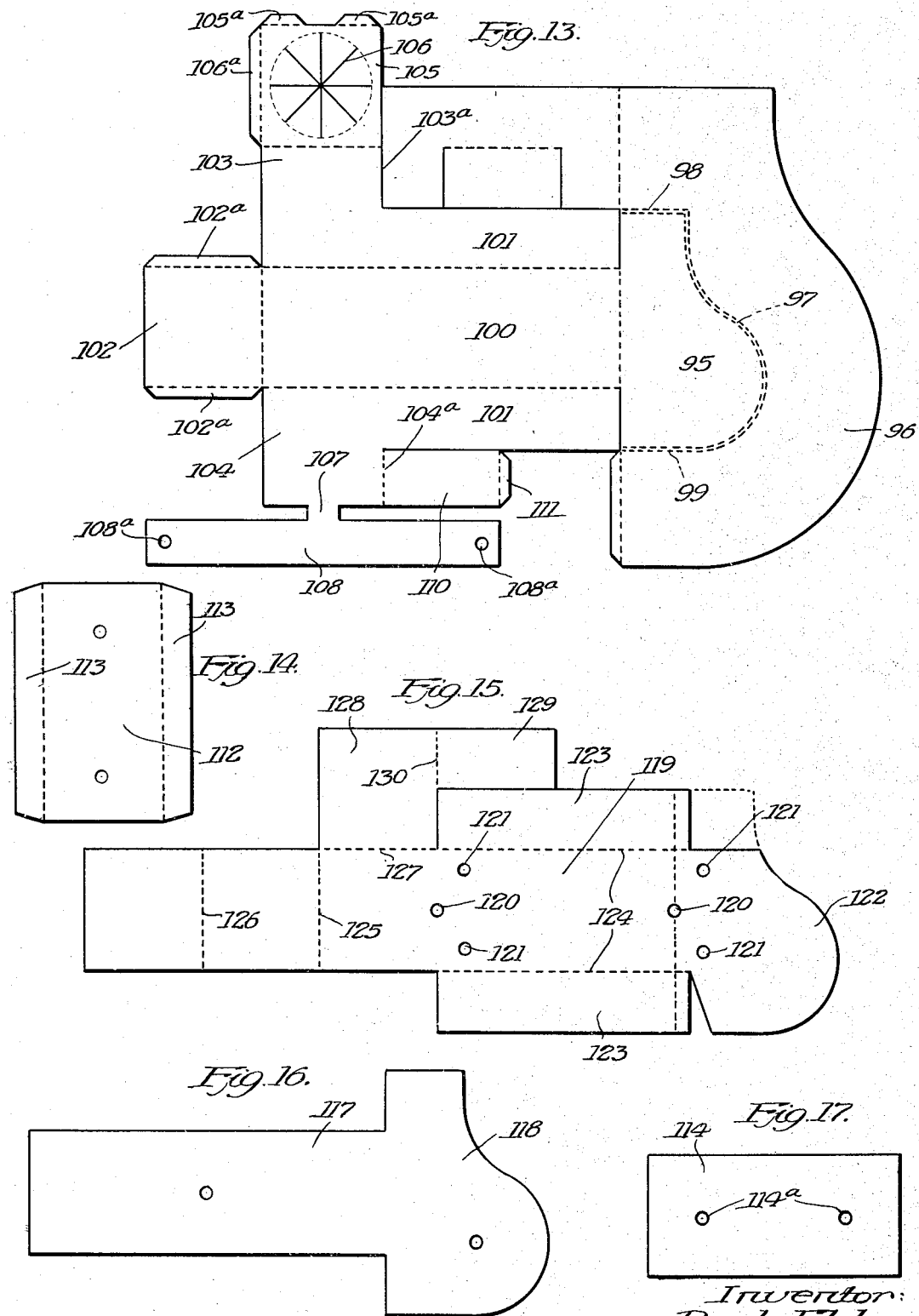

Patented Dec. 15, 1936

2,064,199

UNITED STATES PATENT OFFICE 2,064,199

ELECTRICAL CONDUIT

Paul Elder, Chicago, Ill., assignor to Roy D. Lamond, Chicago, Ill.

Application May 21, 1932, Serial No. 612,675

6 Claims. (Cl. 247—3)

This invention relates in general to electrical conduits, that is, conduits for containing electrical conductors, the invention relating specially to improvements in conduits whereby connection with the electrical conductors thereof may be made at substantially any point within the dimensions of the conduits, that is to say, the conduit is of such construction as to permit of the insertion of a connecting plug or the like at desired convenient points without the necessity of having separate and individual outlets.

While the invention is illustrated and described as particularly incorporated in an electrical conduit having an external configuration of a wall molding, such, for example, as may be conveniently applied to the baseboard of a room, it will be understood that the invention is capable of other analogous uses and, therefore, finds a wide field of utility.

Heretofore, the practice in installing electrical conductors for the purpose of electrical outlets to which portable apparatus may be attached, such, for example, as floor lamps, radio receiving sets and the like, has been to place these conductors in the wall of a building or room, and, at spaced points about the room, provide, in the baseboard or the like immediately adjacent thereto, one or a plurality of outlet sockets into which a separable plug may be connected by a suitable external conductor or conductors to the apparatus which it is desired to supply with current. This results quite often either not enough outlets are provided in a room, or they are inconveniently placed so that it requires the furnishing of extra lengths of electrical wire to reach from the outlet to the apparatus to be operated, and this often results in an unsatisfactory arrangement of wiring on the floor of the room or along the baseboard. Furthermore, it often results in conductors being exposed where they must be removed when the room is cleaned, and often persons will trip over the conductors, resulting either in breaking the conductor and blowing a fuse or in upsetting the lamp or other apparatus which may be attached to the outlet.

With the present invention, it is possible to have the entire molding of a room, except at the doorways thereof, provided with this invention so that relatively short lengths of external conductors may be employed, and, if desired, in new installations in buildings in course of construction, the entire molding may be installed containing applicants' invention; in existing buildings, portions of the wooden molding now in place may be removed and applicants' electrical molding substituted therefor.

With the foregoing in mind, the principal objects and advantages of applicant's invention reside in the provision of an improved electrical conduit containing the required conductors and provided with an outlet opening whereby these conductors may be reached with a separable plug at substantially any point from one end of the conduit to the other; the provision of an electrical conduit having substantially the external contour of a conventional wall molding; the provision of an external conduit of the character described in which the conductors are adequately protected against exposure to moisture, dust or against the simultaneous contact with metal instruments which may be inserted into the molding either accidentally or deliberately; the provision of an electrical conduit of the character referred to in which the opening therein is so arranged that liquid, such as paint, water or the like, which may be applied to the walls for cleaning, etc., cannot enter the conduit in which the conductors are so located, and that, if a screw driver or other metal instrument is inserted for the purpose of applying or removing the molding or for replacing the retaining screws or the like, simultaneous contact with the exposed and uninsulated conductors contained therein cannot take place; the provision of an improved electrical conduit in which the structure thereof is substantially fireproof and waterproof; and the provision, in connection with the improved electrical conduit of this invention, of an improved form of connecting plug facilitating contact with the electrical conductors for supplying current to apparatus which it is desired to operate thereby.

This invention also has, as objects thereof, the provision in an electrical conduit of an improved arrangement of the sections thereof whereby connection with the conductors from the line inside of the wall may be facilitated; so that said conductors at all times are contained within a fireproof and waterproof insulating casing; the provision in an electrical conduit, of an improved adapter for connecting the terminals of the conduit to electrical conduits within the walls of a building; and the provision of an improved form of adapter for connecting adjoining sections of the conduit with each other and with conductors within a wall of the building.

This invention also includes a novel construction of the adapters referred to hereinbefore in that the body portions of the casings thereof are so constructed as to be formed of single blanks of sheet metal which may be stamped and then formed into the desired shapes.

The foregoing and such other objects and advantages as may appear or be pointed out as this description proceeds are attained in the several structural embodiments of the invention illustrated in the accompanying drawings, in which:

Figure 1 is an elevational view of this invention applied to a baseboard as a molding element thereof;

Figure 2 is an enlarged vertical sectional view, taken on the line 2—2 of Figure 1, looking in the direction indicated by the arrows;

Figure 3 is an enlarged sectional view of this invention showing an improved form of adapter and corner piece;

Figure 4 is an enlarged sectional view of an adapter for connecting adjoining sections of the conduit and for connecting the conductors thereof to the line conductors within a wall of the building;

Figure 5 is a transverse sectional view of the improved conduit of this invention, taken on the line 5—5 of Figure 6 looking in the direction indicated by the arrows;

Figure 6 is a fragmentary sectional view showing a conduit with the end closure therefor;

Figure 7 is a longitudinal sectional view, taken on the line 7—7 of Figure 3, looking in the direction indicated by the arrows;

Figure 8 is a view similar to Figure 1 illustrating the electrical conduit of this invention installed as a section of existing molding on a baseboard;

Figure 9 is an elevational view of the end adapter member for connecting the conductors of the conduit to line conductors within a wall.

Figure 10 is a longitudinal sectional view, taken on the line 10—10 of Figure 9, looking in the direction indicated by the arrows;

Figure 11 is an enlarged sectional view showing the hole of the connecting plug in end elevation as applied to the conduit, and is a section taken on the line 11—11 of Figure 12;

Figure 12 is a sectional view of the plug member and conduit taken on the line 12—12 of Figure 11;

Figure 13 is an enlarged elevational view of a metal blank from which one of the elements of this invention is constructed;

Figure 14 is an elevational view of a detail; and

Figures 15, 16 and 17 are, respectively, elevational views of additional blanks for forming certain insulating elements of this invention.

Referring now more particularly to the drawings, and first to Figures 1 to 8, both inclusive, it will be observed that in Figures 1 and 2 the baseboard 5, with a bottom molding 6, is shown mounted on the floor 7 of the room. This baseboard 5 is usually applied only outside of the wall 8 and may be of wood or other suitable material. It is customary to apply to the upper edge 9 of the baseboard 5 a molding, also of wood, shown at 10,10 in Figure 8. This molding 10 usually has an external configuration including an enlarged base portion which finishes off the top of the baseboard 5. One contour of such a molding which is quite generally used is that such as is shown in the cross-section of my invention shown in Figure 2, although it will be understood that the molding may take other shapes so that the conduit of the present invention may be made to conform to prevailing shapes of wall molding.

It will be understood that applicant's invention may be substituted for the wooden molding 10, as shown in Figure 1, and which invention is generally designated 11, or, as shown at 11 in Figure 8, my invention may be interposed as a section of desired length, displacing one part of the molding 10.

The conduit of this invention includes an outer casing or housing 12 having a base portion 13 adapted to seat on the upper edge 9 of the baseboard 5. This housing 12 is preferably formed of a sturdy sheet metal bent to provide the base portion 13 which at its outer edge is curved upwardly, as at 14, and at its inner edge joins with the vertical wall 15 which is adapted to lie against the wall 8 of a room. The wall 15 is joined with a top portion 16 which is curved inwardly, as at 17, and outwardly, as at 18, to conform generally to the prevailing shape of baseboard molding. The portion 18 terminates short of the portion 14 so that a longitudinal slot or elongated opening 19 is thus afforded in the outer face of the conduit. It will be observed that the flange formed by the portion 18 extends slightly beyond a vertical plane intersecting the edge of the flange formed by the portion 14 so that there is an overlap thus preventing liquids from entering the conduit in the event that the walls are washed or wall paper is applied or removed.

Within the housing 12 I provide an insulated conduit portion proper, comprising the outer insulated tube 20 and the inner insulated tube 21, these tubes being formed of a suitable insulating material such as hard fibre board or the like suitably rolled and formed to afford an elongated aperture 22 which is in alignment with the opening 19 in the outer casing or housing 12.

These insulating inner conduits 20 and 21 are secured to the housing 12 at convenient intervals by hollow center rivets 23 which are so formed as to provide apertures and countersunk seats for wood screws 23a by which the assembled conduit is fastened in place in operative position.

It will be observed that the hollow center rivets 23 provide a means for complete fabrication of the conduit prior to installation, thus insuring proper registration of the slots 19 and 22 of the housing 12, and insulating conduits 21 and 22, respectively, and at the same time provide a convenient means for fastening the completely assembled conduit in place by the wood screws 23a.

The inner insulated conduit formed of the tubes 20 and 21 is provided with a pair of oppositely disposed conductors, these conductors being bare and uninsulated and arranged in a vertical plane intersecting the plane of the opening 19 and substantially at right angles thereto, the conductors being indicated at 24 and 25 and preferably formed of flat or half round strips of a hard copper so that said conductors will possess a certain amount of resiliency. The conductors are secured to the inner insulated tube 21 by the provision of conveniently spaced rivets 26 and 27, and thus the outer insulated tube 20 of this conduit will serve to prevent contact of said rivets with the metallic housing 12.

It will be observed from an inspection of Figure 5 that the conductors are so disposed within the housing and inner insulated conduit that access to these conductors cannot be had simultaneously by any ordinary screw driver or tool likely to be inserted into the conduit for normal uses. It will be observed that even though a child should insert its fingers into the conduit that, at best, contact can be had with only one of the conductors at a time, which ordinarily does not injure one.

The preferred method of manufacturing the conduit I find to be to first apply the conductors, properly spaced, to a flat strip of fibre which is later rolled to form the inner tube 21, which is properly accomplished by rolling this strip on a mandrel or the like in the presence of heat such as steam. The outer tube 20 may then be applied in the same manner, and separately riveted to the inner tube if desired, and the inner conduit is then ready for insertion into the outer casing 12 from one end thereof, or said casing may be formed about the inner conduit if desired.

The foregoing is a description of the conduit of this invention in its simplest form, that is, in a form such, for example, as is shown in Figures 1 and 8. If it is desired, the ends of the conduit may be closed by end caps, one form of which is shown in Figures 5 and 6. Here the end cap is provided with an outer metallic end wall 28 which is provided with a peripheral wall 29 conforming generally in shape to the cross section of the casing 12. This outer end wall 28 is provided with an inner insulating portion 30 which is adapted to abut the end of the inner conduit 20, 21. It will be observed that the conduit comprising the outer casing 12 and the inner tube 20, 21 may be cut to the desired length and then the closing cap 28 applied, it being noted that the peripheral wall 29 may be offset so that it may be inserted into the metallic housing 12. A disc 31 of insulating material is secured by rivets 32 to the insulating wall 30 and this disc fits within the inner tube 21 and is provided with notches 33 for accommodating the adjacent ends of the conductors 24 and 25. The end closing cap 28 is also shown at each end of the conduit section in Figure 8.

It will be understood by those skilled in the art that the conduit sections may come in normal lengths of 6 or 10 feet and that, in some instances, it may be desired to have greater lengths. This may be accomplished by joining two 6-foot or two 10-foot lengths, and, for this purpose, I provide the junction section or adapter best shown in Figures 3 and 7. In this instance the adapter comprises an outer casing 35 having substantially the same dimensions and configuration as that of the casing 12 except that no slot is provided in these sections, the opposite ends of the casing or housing 35 being reduced in dimension, as indicated at 36a and 37a, so that these ends may be inserted into the adjoining ends of the casing sections 12, 12 shown in Figure 7. The adapter shown in Figure 3, indicated at 35a, is employed at a corner of a room and may serve the same function as the adapter 35 shown in Figure 7, but the adapter 35a is further modified as indicated in Figure 4, to be presently described.

Reverting to Figure 7, it will be observed that the adapter connector 35 is provided with an internal insulated conduit section represented by the inner and outer tubes 36 and 37 which are secured to the coupling or adapter portion 35 by the rivets 38. The ends of the inner and outer tubes 36 and 37 are cut back from the ends of the casing 35 as indicated at 39, 39, so as to abut the ends of tubes 20 and 21 of the main conduit sections when the adapter connector is in place. In this instance, the conductors 40 and 41 contained within the inner tube 36, 37 are secured thereto by rivets 42, 43, the opposite ends being formed with spring tongues 44, 44 and 45, 45, which are shaped so as to facilitate their engagement and contact with the adjacent ends of the conductors 24 and 25 of adjoining conduit sections. The spring tongues 44 and 45 are of sufficient spring strength to form intimate contact with the adjoining conductors and thus prevent interruption of the circuit at this point due to vibration.

The conductor coupling member 35a, shown in Figure 3, has the same arrangement of spring tongue conductor members as shown in Figure 7, but one of these conductor elements being shown in Figure 3 and indicated at 41a and 44a and 45a.

Upon reference to Figure 4, it will be observed that this adapter 35a may be formed with a laterally extending tubular portion 47 internally insulated by a fibre tube 48 to which the strip conductors are connected, these conductors extending to and connecting with the complemental conductor 41a as indicated at 50. The line conductors 51 may be connected to the strap conductors 49, as shown in Figure 4, it being understood that the laterally extending tubular portion 47 passes through a suitable opening in the wall for connection to line conductors, and is formed from a blank similar to that of Figure 13 and provided with a junction box for connection to the conventional conductor cable as described hereafter in connection with Figure 9.

Reverting to Figure 3, it will be observed that this figure discloses a corner coupling or adapter by which the conduits mounted on angularly related walls of a room may be connected. In this case the adapter comprises an outer casing or housing 52 having the angularly related portions 53 and 54, one of which is adapted to receive the adjacent end of one of the coupling adapters 35a. In an original installation, of course, it is possible to form one end of the casing 52 so as to be inserted directly into the adjoining conduit section and to provide spring conductors in the casing 52 similar to those shown at 41a in the adapter 35a. This has the desirable advantage that it eliminates the adapter at this point. A possible modification of the adapter 52 for this purpose is shown at the upper left end of Figure 3, the left end of the portion 53 being reduced in dimension, as shown at 55, for reception in the adjacent end of the conduit section 12, the conductors 56 in said corner adapter, only one of which is shown, being extended as at 57 similar to the conductors 41a.

It is intended that Figure 3 illustrate two possible forms of the corner adapter, that is to say, one end of the adapter 52 is arranged to connect with a coupling section 35a and the other end is arranged for direct connection to a conduit section 12 and it will be understood that the corner adapter may be constructed in either way desired.

When the corner adapter is made as a conduit section as the portion 54 of Figure 3 it is provided with the slot as at 58 for the insertion of a connecting plug. The casing and insulating tubes would then be fastened together by hollow center rivets 59 and the assembled conduit fastened to the wall by wood screws 59a in the same manner as for a standard conduit section as above described.

When the corner adapter is made as an adapter section, the construction is as above described for the adapter 35.

The corner adapter is provided with the internal insulated conduit section 60 which, when originally formed, is shaped of a single piece of fibre in each instance rolled and then bent, as indicated at 61, to form the right angular section shown, or any one desired.

For establishing connection with the conductors in the conduit, I have provided a special type of plug member shown best in Figures 2, 11 and 12.

The connecting plug comprises a handle portion, designated 62 in Figures 11 and 12, provided with a longitudinally extending neck or shank 63, which is inserted into and through the slots 19 and 22 formed in the housing 12 and conduit sections 20, 21.

This shank or neck 63 is formed with a terminal carrying head 64, one transverse dimension of which is substantially the same as that of the diameter of the shank 63, another dimension of said terminal head being sufficient to bring terminals carried thereby into intimate contact with the opposite conductors 24 and 25 within the conduit when said plug is rotated.

The handle portion 62, shank 63 and head 64 are all preferably cast integrally of some standard and well approved insulating material such, for example, as bakelite, hard rubber or the like, and a bore 65 is provided through which the twin connecting cable 66 containing the conductors 67 and 68 may extend, this cable being extended from the plug to any desired apparatus to be operated. The ends of the conductors 67 and 68 are brought out through the head 64 and are connected by cap screws 69, 70 to lugs 71 and 72 carried by metallic terminal members 73 and 74 which are preferably of a spring character and formed with spaced ridges 75 and 76 which, when the head is rotated, receive the conductors 24 and 25 therebetween, as best shown in Figure 12. These terminal members are secured by embedding rivets 77 and 78 in the opposite sides of the head 64. It will be observed that, due to the spring nature of the terminal members 73 and 74, and the cooperative effect of the ridges 75 and 76, that, when said head is rotated to bring the terminal into engagement with the conductors, the frictional engagement thereby will prevent accidental dislodgement of the plug. To further insure the retention of the plug against accidental displacement, the shank 63 may be of such length that the handle 62 will abut the flange 18 and thus further tend to prevent undesired rotation of the head 64 or lateral displacement of the plug in the conduit. The handle member 62 may have a portion thereof flattened as indicated at 62a.

A further alternative form of the plug is additionally shown in Figure 2. Here the handle portion 62b is made substantially cylindrical and provided with internal terminal members 62d similar to the conventional form of plug and socket, the outer portion 62c being provided with tongue members 80 which are adapted to engage the terminal members within the handle 62b, the plug member 62c being separable from the handle to permit of substitution of a new plug member in the event that the handle 62b should become broken by furniture being moved against the same, or the like. Another advantage of this construction is that the body and shank of the plug being made of insulating material permits the use of uninsulated conductors therein placed in individual bores, as shown.

In some installations the end closure member shown in Figure 6 may be modified, as shown in Figures 9 and 10, in which instance this end closure member, indicated at 81 and provided with the spring conductor tongues 82 and 83, may be formed with a laterally extending housing forming a conduit portion 84 having strap conductors 85 and 86 riveted in position, as at 87, to an insulating lining 88. The electrical conductors 89 and 90 are connected to the inner ends of the strap conductors 85 and 86, and the laterally extending housing 84 is provided with an inner enlarged portion forming a junction box 85a suitably apertured, as at 91, to receive the inner end of a standard BX cable 92.

The BX cable is clamped in position on the junction box 85a by a spring clamp composed of the arms 93 secured in position about the cable by a bolt 93a.

The end connecting member shown in Figures 9 and 10 is additionally shown in Figures 13 and 14 wherein the main body portions 81, 84 and 85a thereof are formed from substantially a single blank of metal.

This blank of metal comprises the end wall portion 95 formed with an outer peripheral portion 96 which, when formed and shaped along the lines 97, 98 and 99, will assume the shape shown at the right in Figure 9 to afford the end closure member 81.

The end portion 95 is integrally connected with a side wall portion 100 which forms one of the walls of the trough-like conduit portion 84, this wall 100 having flanges 101 and 102 on the margins thereof which, when bent at right angles to the wall 100, form the trough-like conduit portion 84. The wall at 100 is extended to form an end closing wall 102 forming part of the junction box 85a, the other walls of this junction box being comprised in the lugs 103 and 104 formed in the side blank. The member 103 is extended to provide an end closing wall 105 for the junction box 85a and is bent at right angles to the wall 103 which is, in turn, bent at right angles to the wall 100 so that it is in the same plane as the flange or side wall 101. To facilitate retention of the BX cable in the box 85a, the aperture 91 is formed by a plurality of intersecting slits indicated at 106 in the wall 105, which are pushed inwardly, as shown at 91 in Figure 10.

The tongues thus formed by the slits 106 will yieldingly impinge on the convolutions of the BX cable and thus tend to prevent same from being withdrawn when once inserted.

The opposite wall 101 is provided with the lug 104 forming a wall complemental to the wall 103 and the clamp shown in Figure 9 is formed by a tongue 107 having a laterally extending enlarged portion 108 which is rolled to form the two jaws 93 of the clamp shown in Figure 9, the head 108 being apertured at 108a to form openings for receiving the bolt 93a. The apertured wall 105 is provided with a plurality of tongues 105a and tongue 106a, the tongues 105a being bent into abutment with the outer edges of the wall 104. The rear closing wall 102 is provided with lugs or flanges 102a which are adapted to be folded down against the walls 103 and 104 and thus form a box-like structure such as that shown in Figures 9 and 10 and indicated at 85a. In order to connect the edges 103a and 104a of the walls 103 and 104 across the outer edges of the walls 101, I provide a tongue 110 having an extending lug 111, this tongue being bent on the line 104a which is one edge of the wall 104, and the lug 111 being bent around the edge 103a.

When this blank is formed into the shape shown in Figures 9 and 10, an opening, indicated at 84a in Figure 9 will be produced, and this opening is then closed by a separable cover member 112 shown in Figure 14, the edges of the cover 112 being provided with tongues 113 which may be bent to overlie the adjacent edges of the walls 101 of the laterally extending conduit portion 84. To the inner surface of the closure 112 is secured an insulating strip 114 which underlies the edge of the wall 110, as indicated at 115 in Figure 10, said insulating strip also underlying a flange 116 formed on the peripheral wall 96 of the end closure member 81, as shown in Figures 9 and 10.

This insulating strip 114 is shown in detail in Figure 17 and is provided with suitable apertures 114a by which it may be riveted, as indicated at 114b, to the closure member 112. The purpose of leaving the opening to be closed by the closure member 112 is to permit of access to the conductors 89 and 90 for soldering or otherwise attaching them to the strip conductors 85 and 86.

The entire housing composed of the sections 81, 84 and 85a is internally lined with insulating material formed from a blank shown in Figures 15 and 16. The inner strip, that is, the strip adjacent to the wall 100 and indicated at 117 in Figures 10 and 16, includes an elongated shank portion and a head portion 118 having the general configuration of the casing portions 81 and 84 so that it fits snugly therein against the wall 95 and 100 thereof. This element is riveted at desired intervals to the wall against which the same lies.

Against this insulating lining 117 there is provided the lining 119 shown in Figure 15 and, as this lining is the outer one, it carries auxiliary portions which engage the several angularly related walls and thus adequately insulates the metallic portions of the house from the electrical conductors contained therein. This blank, indicated at 119, is provided with rivet openings 120 by which it is secured to the strip 117, and the two strip conductors 85 and 86 are secured to the strip 119 by the provision of rivet holes shown at 121. The tongue portions 82 and 83 of the strip conductors, of course, extend laterally to the main portion of the conductors and are appropriately shaped to engage with the conductors in an adjoining conduit section. The head portion 122 of the blank 119 fits within the casing 81 and the longitudinal portion of the blank, indicated at 119, is provided with insulating flanges 123 along the edges thereof which are scorings, as at 124, so that they may be bent into alignment with the walls 101. At the end of the blank 119 remote from the head 122 are provided spaced scorings 125 and 126 by which the insulating strip may be bent to fit along the walls 102 and 105.

An additional scoring 127 is provided so that the laterally extending portion 128 may be bent to fit the wall 103 and a laterally extending tongue 129 which is scored at 130 may be bent to fit along the wall 110. It will thus be seen that all of the exposed metallic walls of the inner surface of the end connector composed of the housings 81, 84 and 85a may be completely covered with an insulating lining which prevents contact of this metallic casing with any of the electrical conductors contained therein.

Having thus described my invention and illustrated its use, what I claim as new and desire to secure by Letters Patent is:

1. In a conduit for electrical conductors, an outer casing, an inner cylindrical tubular structure of insulating material carrying electrical conductors, said casing and tubular structure being open at one end, and a closure for said end having a wall adapted to engage the outer casing, and an insulating plug member adapted to enter and close said inner tubular structure.

2. In a conduit for electrical conductors, an outer casing, an inner cylindrical tubular structure of insulating material carrying diametrically oppositely disposed electrical conductors, said casing and tubular structure being open at one end, and a closure for said end having a wall adapted to engage the outer casing, and an insulating plug member adapted to enter and close said inner tubular structure and engage between said conductors for maintaining their adjacent ends in spaced relationship.

3. In an electrical conduit, in combination, a normally expansible housing provided with an elongated opening and an enlarged internal passageway containing electrical conductors having oppositely disposed exposed portions, a rotatable connecting plug insertable at any point along said opening provided with conductors and having a head provided with oppositely disposed terminals adapted for contact with and to impinge upon said oppositely disposed exposed portions of said conduit conductors upon insertion of said head into said conduit and partial rotation of said head therein whereby said plug is retained by compression between said conduit conductors.

4. An electrical connecting plug including a body or handle portion, a cylindrical shank extending from said body and provided with an enlarged elongated head whose axis lies transversely of said cylindrical shank, terminal contact members on the opposite ends of said head, electrical conductors threaded through said body shank and head of said contact members, said head having its transverse dimension substantially the same as the diameter of said shank so that when the head is inserted into a receiving conduit having spaced exposed conductors in opposed relation, said connecting plug may be moved through an arc of 90 degrees about the axis of said cylindrical shank and said terminal contact members on the ends of said head be brought into engagement with said conductors.

5. In an electrical conduit, in combination, an outer casing having a continuous longitudinal opening of uniform section a tube of dielectric material in said casing comprising inner and outer nested portions, said tube having a continuous slot registering with the longitudinal opening in said outer casing, and exposed conductors mounted in diametrically opposed spaced relation on the inner of said nested portions and arranged on opposite sides of said opening and slot.

6. A coupling member for a conduit including a head portion having an open side for axial engagement with a conduit, a housing extending laterally with respect to said open side and attached to said head, a junction box formed on the free end of said housing, said coupling, including the head, housing and junction box being formed of a single blank of material, and when assembled being adapted to receive a conductor having a connecting portion extending axially of said head.

PAUL ELDER.